United States Patent [19]

Seagle

[11] Patent Number: 5,780,293
[45] Date of Patent: Jul. 14, 1998

[54] SYSTEM AND METHOD FOR CAPTURING AND DESTROYING HAP/VOC SUBSTANCES USING MICROBIAL DEGRADATION

[75] Inventor: Edward D. Seagle, Andrews, N.C.

[73] Assignee: Agri Microbe Sales, Inc., Chester, Va.

[21] Appl. No.: 859,487

[22] Filed: May 20, 1997

[51] Int. Cl.$^6$ .................. C12M 3/00; A61L 9/01
[52] U.S. Cl. .......... 435/266; 435/297.1; 435/298.2; 435/821; 96/108; 96/125; 96/15; 261/95; 261/101
[58] Field of Search .................. 435/262.5, 266, 435/297.1, 298.1, 298.2, 821; 96/108, 125, 150; 261/94, 95, 100, 101, DIG. 9

[56] References Cited

U.S. PATENT DOCUMENTS 4,959,084  9/1990  Wolverton et al. ............ 55/68
5,635,394  6/1997  Horn ............................ 435/266

*Primary Examiner*—David A. Redding
*Attorney, Agent, or Firm*—Hazel & Thomas

[57] ABSTRACT

A system for capturing HAPs/VOCs from an existing or planned air stream and destroying the contaminants in the air stream by microbial degradation is disclosed. In general, the system is composed of a housing that contains a rotating drum. The drum contains a capture or filtration media through which contaminated air or vapors must pass. HAPs/VOCs in the air or vapors are filtered out and absorbed by the capture media. The rotating drum sits in a water bath that is inoculated with microorganisms that are selected to degrade the hazardous materials or pollutants removed by the capture media.

8 Claims, 2 Drawing Sheets

5,780,293

SYSTEM AND METHOD FOR CAPTURING AND DESTROYING HAP/VOC SUBSTANCES USING MICROBIAL DEGRADATION

BACKGROUND OF THE INVENTION

1. Field of the Invention

The present invention relates to a system and method for capturing hazardous air pollutants (HAPs) and/or volatile organic compounds (VOCs), and then using naturally occurring micro-organisms to degrade those substances into non-hazardous byproducts, such as carbon dioxide and water.

2. Description of the Prior Art

Currently, various industries and manufacturing operations utilize processes that use and/or produce large volumes of HAPs and VOCs that typically end up as hazardous wastes that are released into the environment or stored in hazardous waste sites. Often, in order to comply with state and federal environmental regulations, some industries must either invest in the implementation of waste destroying/recycling equipment, pay for others to remove, destroy or recycle the hazardous wastes they produce, or pay considerable sums in fines or compensation fees for as long as they are producing those hazardous waste materials.

Some industries, such as the furniture manufacturing industry, by the very nature of the products or services they provide, cannot simply eliminate these hazardous waste producing processes or even find effective substitutes for such processes. For example, manufacturers of finished wood furniture use large quantities of varnishes, lacquers and other finishing substances that are petroleum hydrocarbon-based. These substances are often applied to furniture using large spray booths, wherein the excess of those substances are vapors that are simply ventilated out to the atmosphere using blowers. As one of skill in the art may note, only a fraction of the finishing substances sprayed onto the furniture in a spray booth actually remain on the furniture. Rather, a large percentage of those substances are eliminated as waste products. Alternatively, the application of materials as sprays in spray booths or other similar operations may result in the release of large quantities of propellants, additives, by-products and other substances in vapor form into the atmosphere. As a consequence, in the context of this example, not only can an industry be forced to comply or compensate for state and federal requirements are great cost, but also that industry can be producing large volumes of hazardous waste products without any potential for recovery or recycling of those waste products.

Therefore, there exists a need in the industry for a system that will effectively recover and recycle hazardous materials released into the atmosphere in vapor form, such as varnishes, lacquers and other finishing substances that are petroleum hydrocarbon-based, in order to avoid the unnecessary waste of those materials and the unneeded expulsion of HAPs/VOCs into the atmosphere.

There exists a further need in the industry for a system that will cost effectively recover and recycle hazardous materials, and that will satisfy federal and state requirements for preventing the expulsion of HAPs/VOCs into the atmosphere.

SUMMARY OF THE INVENTION

It is therefore an object of the present invention to provide a system that will effectively recover and recycle biodegradable, hazardous materials released into the atmosphere in vapor form, such as varnishes, lacquers and other finishing substances that are petroleum hydrocarbon-based, in order to avoid the unnecessary waste of those materials and the unneeded expulsion of HAPs/VOCs into the atmosphere.

A further object of the present invention is to provide a system that will cost effectively recover and recycle biodegradable, hazardous materials, and that will satisfy federal and state requirements for preventing the expulsion of HAPs/VOCs into the atmosphere.

In general, the present invention is directed to an apparatus and method for capturing HAPs/VOCs from an existing or planned air stream and destroying the pollutants in the air stream by microbial degradation or bioremediation. In at least one embodiment, the present invention is composed of a housing that contains a rotating drum. The drum contains a capture or filtration media through which contaminated air or vapors must pass. HAPs/VOCs in the air or vapors are filtered out and absorbed by the capture media. The rotating drum sits in a water bath that is inoculated with microorganisms that are selected to degrade the hazardous materials or pollutants removed by the capture media.

An even further object of the present invention is to provide a system that removes HAPs/VOCs from an air or other gaseous stream using microbial degradation in conjunction with removing and processing natural elements from the air stream for re-use.

In at least a first aspect, the present invention is directed to a system for recovering and recycling HAPs/VOCs from an air stream using bioremediation. The system incorporates a housing that includes a water bath tank portion, a rotating drum containing a capture material therein, the drum being rotatively mounted in the water bath tank portion of the housing, and means for rotatively driving the drum such that the drum is adapted to continuously rotate in the water bath portion of the housing. The housing is adapted to hold a microbe-inoculated volume of water such that the drum is positioned partially submerged in the volume of water, the volume of water being inoculated with a predetermined type of microorganisms having an affinity for oil-based materials. The drum includes a perforated wall structure through which HAPs/VOCs and the microbe-inoculated volume of water pass so as to interact with the capture material.

In a second aspect, the invention is directed to method for recovering and recycling HAPs/VOCs from an air stream using bioremediation. The method includes the steps of providing a perforated drum containing a capture material therein, providing a microbe-inoculated water bath so as to position the drum partially submerged in the water bath, inputting HAPs/VOCs in an air stream into the perforated drum, whereby the HAPs/VOCs are absorbed into the capture material, and rotating the perforated drum in the water bath so as to leach the HAPs/VOCs into the microbe-inoculated water bath and thereby bioremediate the HAPs/VOCs therewith.

BRIEF DESCRIPTION OF THE DRAWINGS

The invention will be further described in conjunction with the accompanying drawings in which.

DETAILED DESCRIPTION OF THE PREFERRED EMBODIMENT

Figure 1:
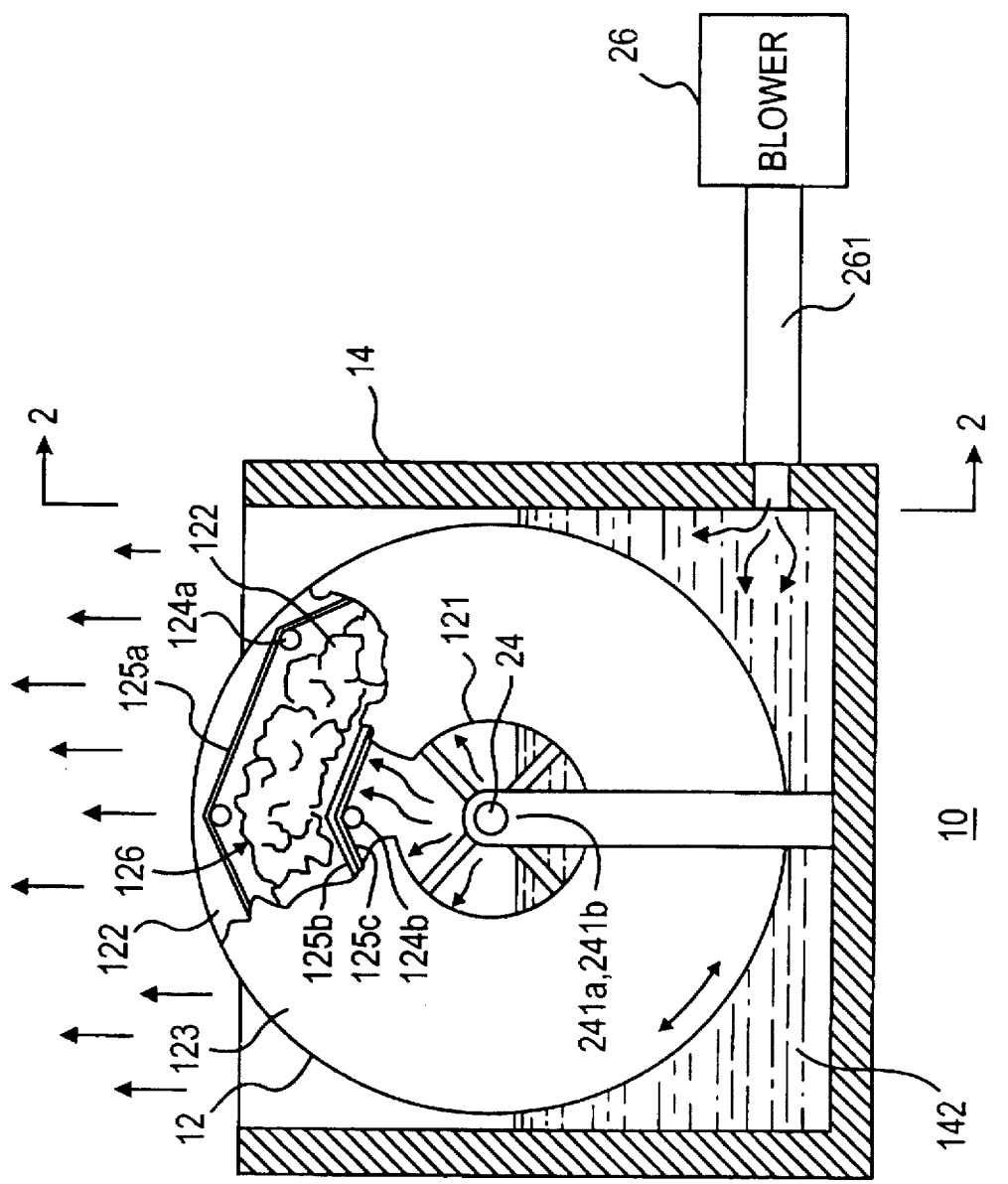
FIG. 1 is a front cross-sectional and partial cutaway view along section line 1—1 shown in FIG. 2 of the overall structure of the present invention.

With reference to the figures, like reference characters will be used to indicate like elements throughout the several embodiments and views thereof. In particular, with reference to FIGS. 1 and 2, the present invention is directed to a system 10 that is composed of a rotating drum 12, a housing 14, an input conduit 16 connected to an input port 141 of the housing, and a drive unit 18 operatively connected to rotate the drum 12. Depending upon the specific application of the system 10, an output conduit or device 20 may be included through which gaseous or vapor by-products produced by the microbial degradation of the inputted hazardous materials are released.

The rotating drum 12 incorporates two wheel plates 122, 123 that are positioned parallel to one another and fixedly separated from each other by two sets of spacer rods 124a, 124b. One wheel plate 122 is solid, while the other wheel plate 123 is formed with an aperture or apertures 121 defined in the center of the wheel plate 123. An outer perforated screen 125a is fixedly mounted around the outer perimeter of spacer rods 124a, and between the wheel plates 122, 123, thereby enclosing the space between the wheel plates 122, 123. An inner perforated screen 125b is also fixed along the inner perimeter of spacer rods 124b between the wheel plates 122, 123, whereby the outer and inner perforated screens define an enclosed space 126 between the wheel plates 122, 123. Essentially, the inner and outer perforated screens form the enclosed space 126 into a cylindrical or semi-cylindrical shape.

The enclosed space 126 is filled with a capture or filtering media 22, such as carbon, granulated activated carbon, zeolite or other equivalent materials that can absorb HAPs/VOCs and leach those contaminants into a water bath. The amount of capture media used will vary depending upon the specific application of the system 10 and the dimensions of the system. For example, with a rotating drum 12 that is 78 inches in diameter and 120 inches (10 ft.) in length, approximately 165.8 cu. ft. of capture media will be cached in the enclosed space 126.

A perforated structural material 125c may be included on load carrying sides of the inner and outer perforated screens 125a, 125b in order to support the weight of the capture or filtering media.

A main shaft 24 is attached to the wheel plates 122, 123 and extends through the wheel plates, wherein rotation of the main shaft 24 will in turn rotate the drum 12. The main shaft 24 is supported on shaft bearings 241a, 241b in the housing 14. The drive unit 18 is operatively connected to the main shaft 24, such as through a gear reducing mechanism 181.

The components of the drum 12 and the main shaft 24 may be constructed from materials known in the art that are capable of supporting the structural loads applied to them, and of not deteriorating with exposure to water, the contaminants to be processed, microbiological growths and the products of microbiological reactions. Such materials include but are not limited to stainless steel, PVC, reinforced fiberglass, painted carbon steel and coated carbon steel. The outer and inner perforated screens 125a, 125b and the perforated structural material may be formed using, among other example materials, reinforced fiberglass, painted carbon steel and coated carbon steel.

The drive unit 18 and its gear reducing mechanism 181 may be implemented using any motive source known in the art for continuously rotating the drum 12 at a rate desired or as dictated by the application of the system 10. Examples of the drive unit include a Perfection Gear Model No. TCD 521 200C ½ HP electric motor. In addition, the drive unit 18 may be coupled to the main shaft 24 using conventionally known techniques, such as a gear or gear reducing mechanism, or a belt drive system.

Figure 2:
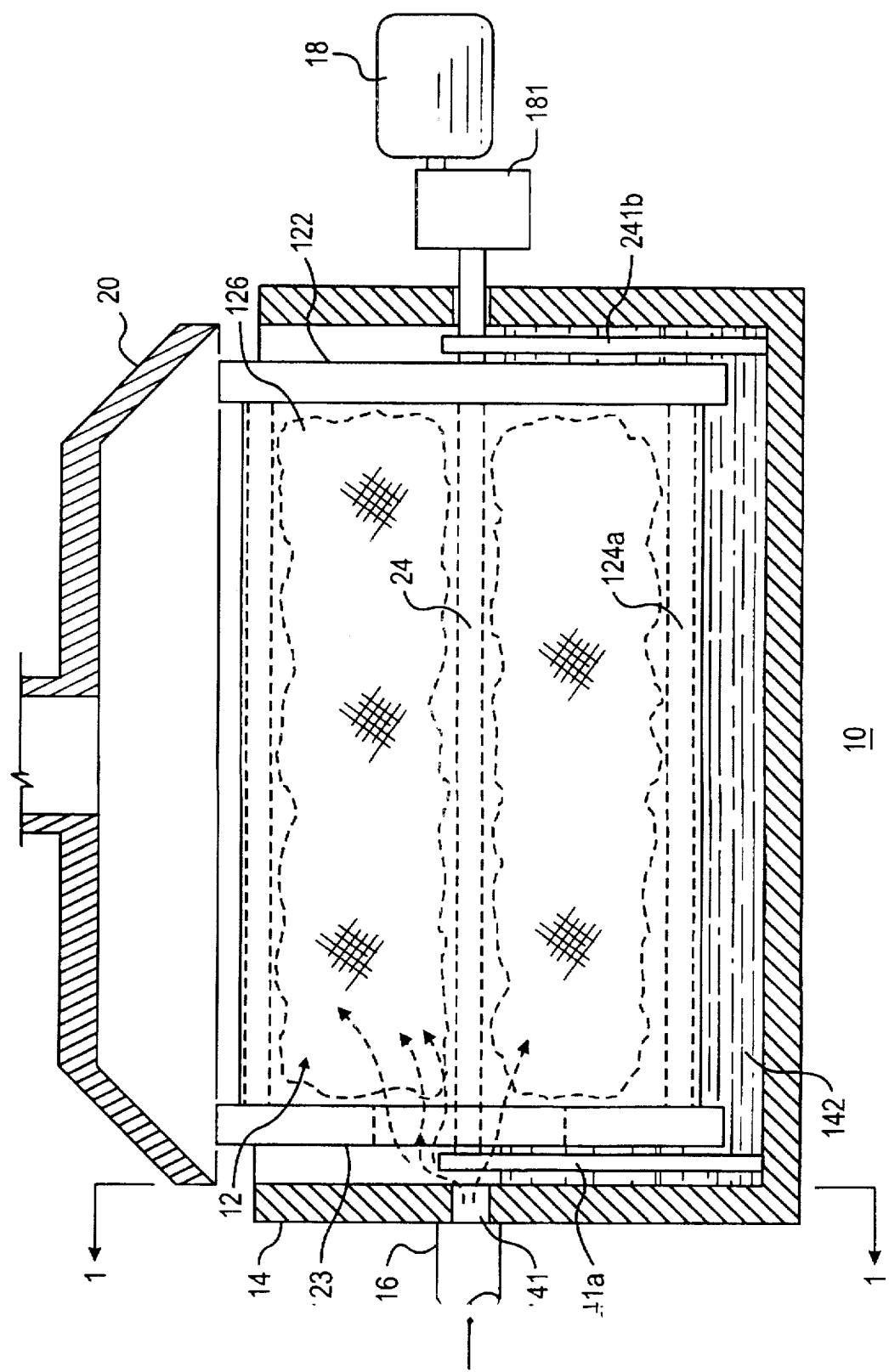
FIG. 2 is a side cross-sectional view along section line 2—2 shown in FIG. 1 of the overall structure of the present invention.

The housing 14 is essentially a square or rectangular box-shaped enclosure in which the shaft bearings 241a, 241b are fixedly mounted, whereby the main shaft, when engaged with the bearings, rotatably mounts the drum 12 in the housing 14. The input port 141 of the housing is aligned with the aperture 121 of the wheel plate 123 when the drum 12 is positioned in the housing 14, such that when the input conduit 16 is connected to the input port 141, an air stream containing contaminants will flow from the input conduit 16 through the input port 141 and into the aperture 121 of the drum. The upper portion of the housing 14 is formed to be maintained relatively open, whereby any vapor output of the system 10 may be drawn out and away from the system 10. However, different embodiments of the present invention may implement the output conduit or device 20 in different ways as would be known in the art, such as an open exhaust hood as shown in FIG. 2 or an enclosed hood that is fixedly connected to the open upper portion of the housing 14.

During operation, a lower tank portion 142 of the housing 14 operates as a water bath in which the rotating drum 12 sits partially submerged. The water bath is composed of water inoculated with AgriMicrobe Formula V™ microbes. The amount of microbes put into the water and maintained thereafter is generally set at a level consistent with levels that can discharged into a city sewer system or a septic tank system, or can be sprayed onto the ground. In connection with the above-mentioned example size for the rotating drum 12, a housing 14 having dimensions of 84 inches wide×84 inches high×121 inches long would contain 733 gallons of water with ½ pound of AgriMicrobe Formula V. Such a quantity of microbe-impregnated water will keep the drum approximately 33 percent submerged.

To keep the microorganisms in the water bath supplied with oxygen, a blower 26 is integrally formed into the system, wherein air is pumped by the blower 26 through a conduit 261 into the lower tank 142 portion of the housing 14. The structure and operation of the blower 26 are consistent with those of similar devices known in the art for replenishing the oxygen or other contents of a fluid.

In operation, as noted above, a contaminated air stream is fed through the input conduit 16 and into the input port 141 of the housing 14. The air stream then flows into the aperture 121 of the drum 12 and filters through the capture media 22. The capture media 22 traps the contaminants. Meanwhile, as the drum 12 is continuously rotated by the drive unit 18, different portions of the drum 12 and correspondingly the capture media 22 are submerged in the water bath. The contaminants are then leached into the water bath, wherein the microbes in the water will begin breaking down the contaminants into harmless by-products such as carbon, carbon dioxide, water and fatty acid. Gaseous or vaporous by-products are then released or drawn through the open portion of the housing 14, along with any excess air or oxygen pumped into the water bath from the blower 26.

The use of AgriMicrobe Formula V was selected based on the fact that this particular formulation of naturally-occurring microorganisms have an affinity for oil both biochemically and physically, wherein the microbes have been shown to effectively recycle a wide range of organic waste materials by converting them into non-toxic components. In addition, that formula has the advantages of being formed as a dry, powder material with a 5-year shelf life, being usable in either fresh or salt water, having a high concentration of 100 billion cells per gram, and being non-toxic itself. The formula is composed of a microorganism mixture of single cell enzymes ranging in size from 1 to 10 microns, with a pH range of 5.50 to 10.00 and a temperature tolerance of 35° to 120° F. The microorganisms are aerobic, meaning that they require oxygen to operate.

The present invention may use other microbe formulas that can achieve bioremediation and that have characteristics similar to the AgriMicrobe Formula V discuses above. Such other microbe formulas should be selected so as to be capable of bioremediation of materials such as:

---

Acenaphthene
Acrolein
Acrylonitrile
Alkylamine Oxides
Aromatics
Benzene
Biphenyl
Brake Fluid
Branched Hydrocarbons
Chlorinated Phenols
Chloro Naphthalene
Chlorobenzene
Chloroform
Crude Oils
Cyanide
Cutting Oils
Dichlorobenzene
Diesel Fuels
Diethyleneglycol
Ethylbenzene
Fluoanthene
Fuel Oils #1–6
Gasoline
Grease
Halogenated Hydrocarbons
Heating Oils
Heptane
Hexane
Isoprene
Hydraulic Fluids
Hydrocarbons
Jet Fuels
Kerosene
Long Chained Alkenes
Lubricating Oils
Marine Fuels
Mercaptan
Methylene Chloride
Monoalkylbenzenes
Motor Oils
Napthulene
Nitrated Phenols
Oil Base Paints
Oil Base Fluids
Oil Base Ink
Organic Herbicides
Organic Pesticides
Pentane
Phenoxyacetates
Phenylureas
Phthalate Esters
Polycyclic Aromatics
Pulp By-Products
Secondary Alkylbenzene
Sodium Methyl Sulfate
Sulfur
Toluene
Trichloroethylene
Varsol
Vegetable Oils
Xylene

---

Although the present invention has been fully described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A system for recovering and recycling HAPs/VOCs from an air stream using bioremediation, comprising:

a housing that includes a water bath tank portion;

a rotating drum containing a capture material therein, said drum being rotatively mounted in said water bath tank portion of said housing; and means for rotatively driving said drum such that said drum is adapted to continuously rotate in said water bath portion of said housing, wherein said housing is adapted to hold a microbe-inoculated volume of water such that said drum is positioned partially submerged in said volume of water, said volume of water being inoculated with a predetermined type of microorganisms having an affinity for the HAPs/VOCs to be processed, and said drum includes a perforated wall structure through which the HAPs/VOCs and the microbe-inoculated volume of water pass so as to interact with said capture material.

2. A system according to claim 1, wherein said capture material is selected from at least one of carbon, activated granular carbon and zeolite.

3. A system according to claim 1, wherein said predetermined type of microorganisms is AgriMicrobe Formula V.

4. A system according to claim 1, wherein said rotating drum first and second wheel plates fixedly spaced apart from another with said perforated wall structure including inner and outer peripheral screen walls positioned between said first and second wheel plates to form an enclosed cylindrical space, said capture material being contained in said enclosed space.

5. A method for recovering and recycling HAPs/VOCs from an air stream using bioremediation, said method comprising the steps of:

providing a perforated drum containing a capture material therein;

providing a microbe-inoculated water bath so as to position said drum partially submerged in said water bath;

inputting HAPs/VOCs in an air stream into said perforated drum, whereby the HAPs/VOCs are absorbed into the capture material; and rotating said perforated drum in the water bath so as to leach the HAPs/VOCs into the microbe-inoculated water bath and thereby bioremediate the HAPs/VOCs therewith.

6. A method according to claim 5, further comprising the step of:

selecting said capture material from at least one of carbon, activated granular carbon and zeolite.

7. A method according to claim 5, further comprising the step of:

preparing the microbe-inoculated water bath by introducing a predetermined type of microorganisms having an affinity for the HAPs/VOCs to be processed into the water bath.

8. A method according to claim 7, wherein said step of preparing the microbe-inoculated water bath includes selecting AgriMicrobe Formula V as the predetermined type of microorganisms.

* * * * *